Sept. 16, 1930.  H. B. SHOTWELL  1,775,948
AUTOMOBILE SIGNAL
Filed March 20, 1929  2 Sheets-Sheet 1
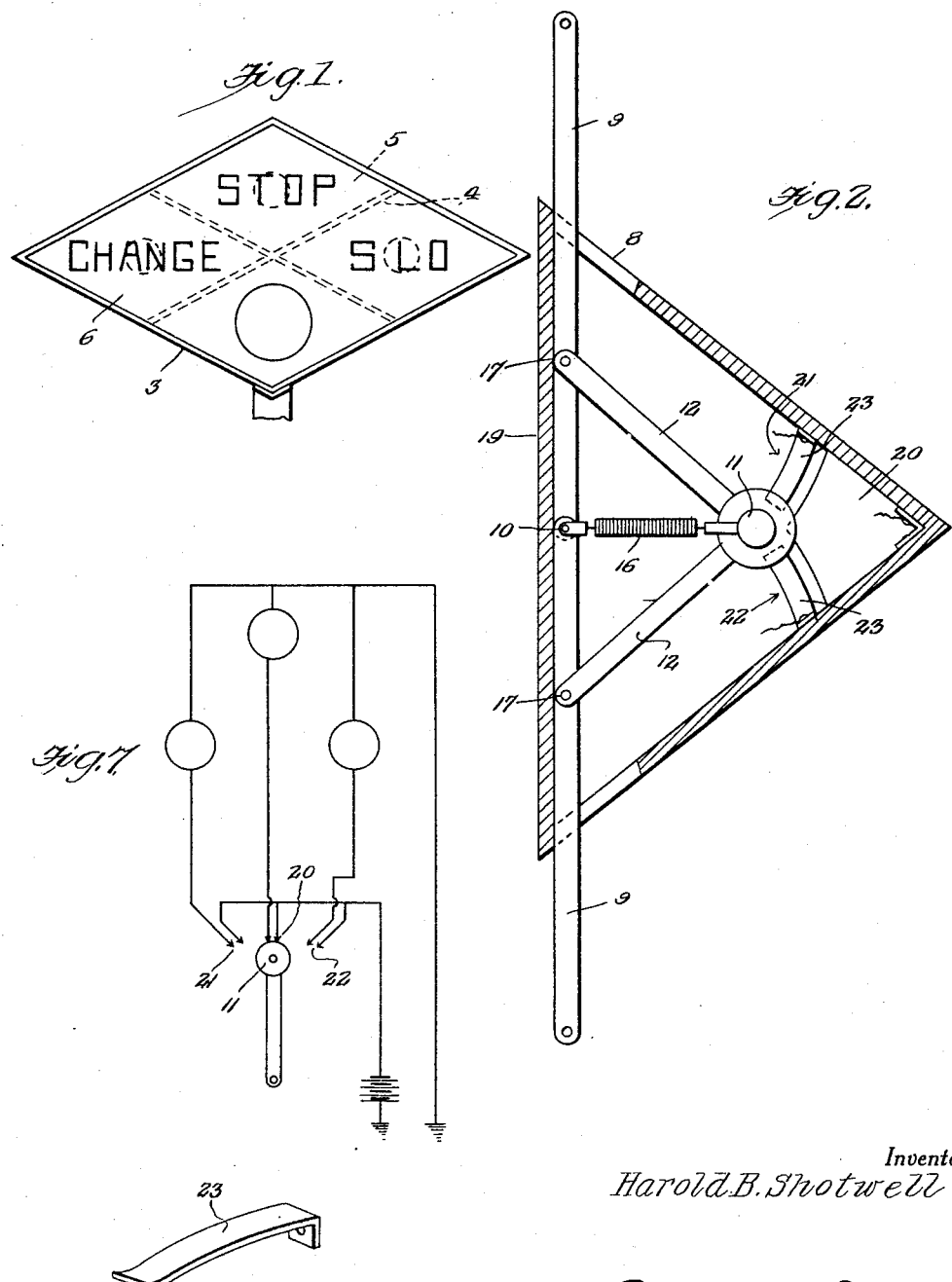
Inventor
Harold B. Shotwell
By Clarence A. O'Brien
Attorney Sept. 16, 1930.  H. B. SHOTWELL  1,775,948
AUTOMOBILE SIGNAL
Filed March 20, 1929  2 Sheets-Sheet 2

Inventor
Harold B. Shotwell,

By Clarence A. O'Brien
Attorney

Patented Sept. 16, 1930

1,775,948

UNITED STATES PATENT OFFICE

HAROLD B. SHOTWELL, OF WHITAKER, PENNSYLVANIA

AUTOMOBILE SIGNAL

Application filed March 20, 1929. Serial No. 348,458.

The present invention relates to improvements in electrical signalling, and more particularly to a directional signal for automobiles.

The principal object of this invention is to provide a signal for automobiles, for indicating the position of the controlling levers of the automobile.

Another important object of the invention is to provide a signal of the lamp box type for automobiles, wherein the lamps are controlled through switch means operated by the usual clutch and brake levers of the vehicle.

Another important object of the invention is to provide a novel switch construction, which because of its brief and positive acting construction will not be susceptible of ready defect.

These and other objects of the invention will become more apparent to the reader after considering the invention as described and claimed hereinafter.

In the drawings:

Figure 1 represents a front elevation of the lamp box.

Fig. 2 represents a horizontal sectional view through the switch construction.

Figure 7 is a diagrammatic view showing the electrical connection between the various details of the invention.

Figure 8 is a fragmentary perspective view of one of the spring fingers used in the construction of the switch.

Referring to the drawings, wherein like numerals designate like parts,

Figure 3 shows the chassis of an automobile, which is generally referred to by A. A clutch pedal B and a brake pedal C are shown mounted in the usual manner.

A substantially diamond shaped lamp box 3 is provided with partitions 4 therein for dividing the box into four substantially diamond shaped lamp compartments 5.

A pane 6 of considerable translucent material is arranged over the front of the box and has indicating matter thereon, such as the word "Stop" "Change" and "Slow." Each of these words is arranged on the pane 6 for disposition over one of the lamp box compartments 5, while the remaining lamp compartment serves as a tail light. The lamp box may be mounted on the rear of the automobile by any means found suitable.

Figure 3:
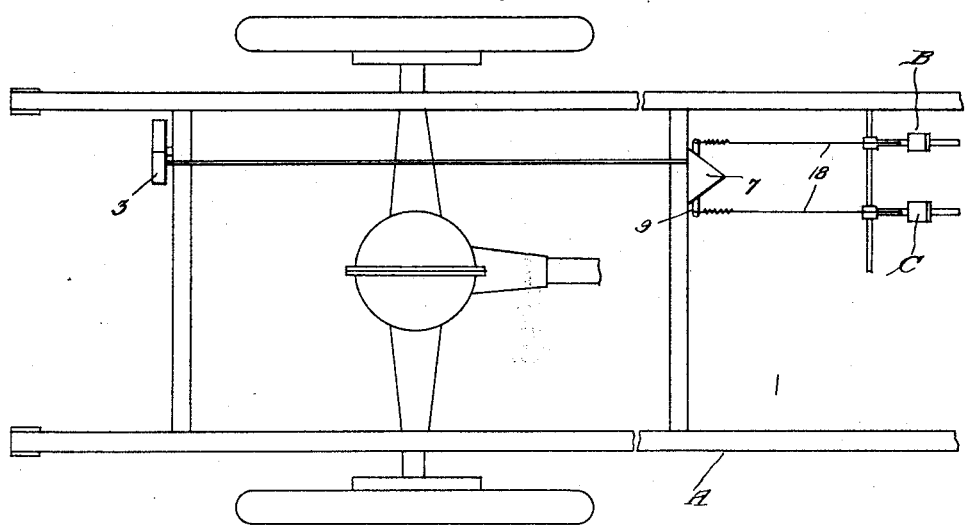
Figure 3 represents a top plan view of the chassis of an automobile carrying the present invention secured to the cross bars thereof.
Figure 4:
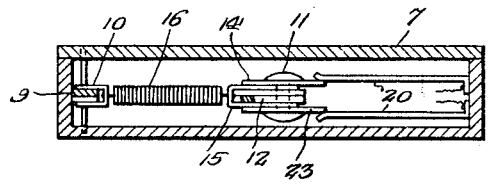
Figure 4 is a vertical sectional view, transversely through the novel switch construction.
Figure 5:
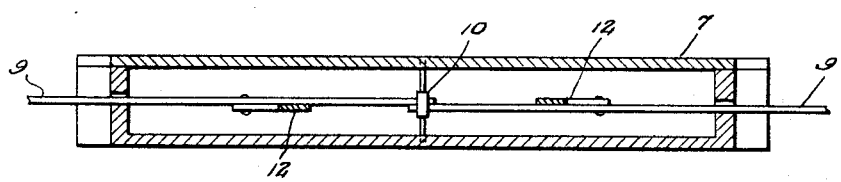
Figure 5 is a longitudinal vertical sectional view through the switch construction.
Figure 6:
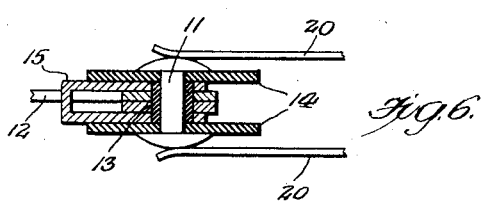
Figure 6 is an enlarged fragmentary sectional view of the switch.

The switch construction consists of a triangularly shaped casing 7, having slots 8—8 formed in a pair of its opposing side walls. Disposed through each slot 8 is a lever 9 and these levers are pivotally connected together at their inner ends as at 10. A rivet of suitable conductive material is designated by numeral 11 and connects together a pair of link members 12—12 at one of their ends. A bushing 13 insulates the link members 12—12 from the rivet 11, in the manner shown in Figure 6. A disc 14 of suitable insulating material is interposed between each end of the bushing 13 and the adjacent head of the rivet 11. A yoke 15 is journaled through the bushing 13 and has connected thereto a coiled spring 16 which has its opposite end connected to the pivot point 10 of the levers 9. The link members 12—12 are pivotally connected at the points 17, to the levers 9. Suitable connections 18 are made between the outer ends of the levers 9 and the pedals B and C as in the manner shown in Figure 3.

The spring 16 tends to maintain the levers 9—9 aligned against the base portion 19 of the casing 7, while within the casing and at the contact portion thereof is mounted a pair of contact plates 20, which are in connection with the top light and the lamp box. Located adjacent the base 20 is a pair of contacts 21 and 22 disposed in converging relation and each comprising a pair of spring fingers 23.

It is obvious that numerous changes in the specific shape, size and materials may be resorted to in the construction of this novel automobile signal without departing from the spirit and scope of the invention as claimed hereinafter.

Having described the invention, what is claimed as new is:

1. A switch mechanism comprising a casing, a pair of contacts arranged within the casing, a pair of opposed sides of the casing being provided with slots, a lever projecting through each slot and being pivotally connected together at their inner ends, a movable switch member, and a pivotal link interposed between each lever and the switch member, said switch member being movable to engage with said contact.

2. A switch mechanism comprising a casing, a pair of contacts arranged within the casing, a pair of opposed sides of the casing being provided with slots, a lever projecting through each slot and being pivotally connected together at their inner ends, a movable switch member, and a pivotal link interposed between each lever and the switch member, said switch member being movable to engage with said contact, and spring means for maintaining said switch member normally disengaged from the contact.

3. A switch mechanism comprising a casing, a pair of contacts arranged within the casing, a pair of opposed sides of the casing being provided with slots, a lever projecting through each slot and being pivotally connected together at their inner ends, a movable switch member, and a pivotal link interposed between each lever and the switch member, said switch member being movable to engage with said contact, said casing being provided with a substantially flat side wall, and spring means for normally maintaining said levers aligned by engagement against the said wall.

In testimony whereof I affix my signature.

HAROLD B. SHOTWELL.